(12) United States Patent
Mølmann

(10) Patent No.: US 7,752,770 B2
(45) Date of Patent: Jul. 13, 2010

(54) TOOL FOR MEASURING THE DIAMETER OF A BODY WITH POLYGONAL OR CIRCULAR CROSS SECTION

(76) Inventor: Odd Viggo Mølmann, Boks 519 Sentrum, N-9615, Hammerfest (NO)

( * ) Notice: Subject to any disclaimer, the term of this patent is extended or adjusted under 35 U.S.C. 154(b) by 0 days.

(21) Appl. No.: 10/504,178

(22) PCT Filed: Feb. 17, 2003

(86) PCT No.: PCT/NO03/00060

§ 371 (c)(1),
(2), (4) Date: Jan. 10, 2005

(87) PCT Pub. No.: WO03/069268

PCT Pub. Date: Aug. 21, 2003

(65) Prior Publication Data

US 2005/0120575 A1    Jun. 9, 2005

(30) Foreign Application Priority Data

Feb. 18, 2002   (NO) .................................. 20020795

(51) Int. Cl.
*G01B 3/56* (2006.01)
(52) U.S. Cl. .................................. 33/679.1; 33/558.04
(58) Field of Classification Search ............... 33/679.1, 33/558.01, 558.02, 558.04, 558.05
See application file for complete search history.

(56) References Cited

U.S. PATENT DOCUMENTS

| | | | | |
|---|---|---|---|---|
| 149,052 A | * | 3/1874 | Miller | ..................... 33/558.04 |
| 948,523 A | * | 2/1910 | Perkins | ..................... 33/332 |
| 1,553,961 A | * | 9/1925 | Pryce | ..................... 33/555.3 |
| 1,650,653 A | * | 11/1927 | Reiman | ..................... 33/794 |
| 2,531,077 A | * | 11/1950 | Mullin | ..................... 33/332 |
| 2,560,571 A | | 7/1951 | Hawkins | |
| 2,822,623 A | * | 2/1958 | Legois | ..................... 33/332 |
| 4,928,392 A | | 5/1990 | Donaldson | |
| 5,150,545 A | * | 9/1992 | Esteve | ..................... 451/8 |
| 5,177,874 A | * | 1/1993 | Ogorek | ..................... 33/794 |
| 5,428,903 A | | 7/1995 | Pocci | |
| 6,581,294 B2 | * | 6/2003 | Svaldi | ..................... 33/286 |
| 2007/0157484 A1 | * | 7/2007 | Grubler | ..................... 33/679.1 |

FOREIGN PATENT DOCUMENTS

| | | |
|---|---|---|
| DE | 4241335 A1 | 2/1994 |
| FR | 2 617 957 A1 | 1/1989 |
| GB | 2103800 A | 2/1983 |

\* cited by examiner

*Primary Examiner*—G. Bradley Bennett
*Assistant Examiner*—Tania C Courson
(74) *Attorney, Agent, or Firm*—Frommer Lawrence & Haug LLP; Ronald R. Santucci

(57) ABSTRACT

Tool for measuring of the diameter of a body with circular cross section, where two arms (1) are provided in a fixed angle to another, in that a distance sensor device (2) is provided axially between the two arms (1), in that the distance sensor device (2) is adapted to register a contact point for the distance sensor device (2) against the body with respect to the contact points of the arms against the body, and that a viewing device (3) is adapted to calculate and show the diameter of the circle on the basis of the three contact points on the circle.

4 Claims, 3 Drawing Sheets

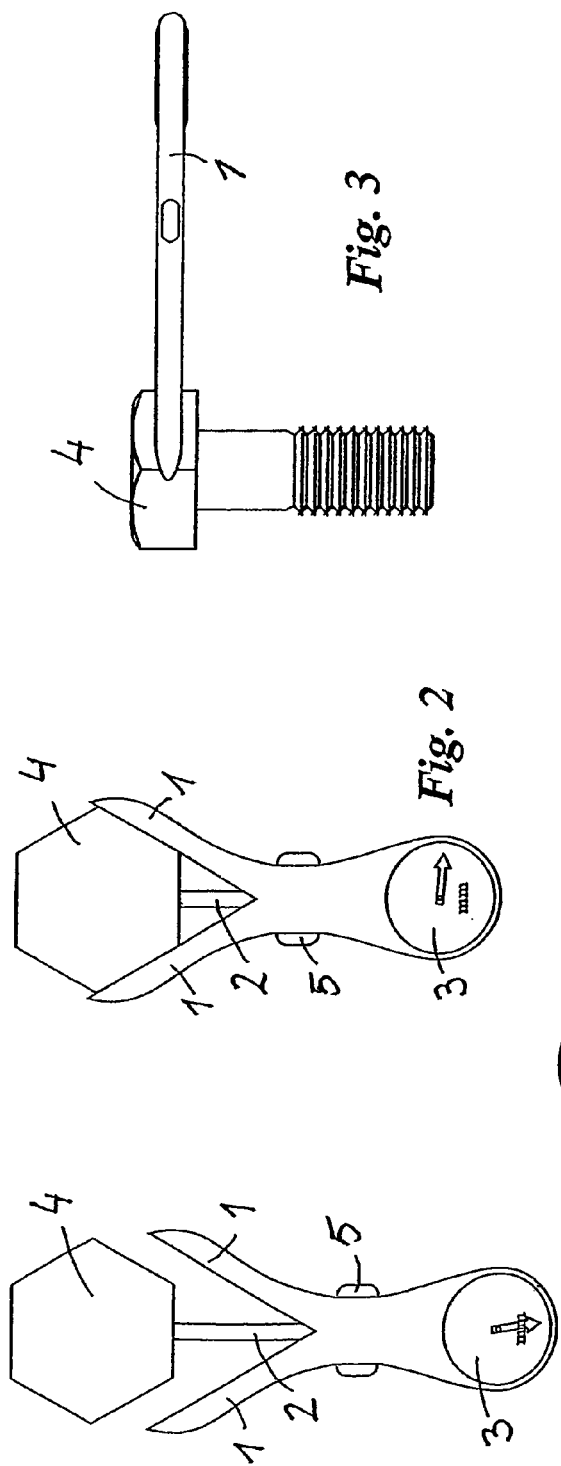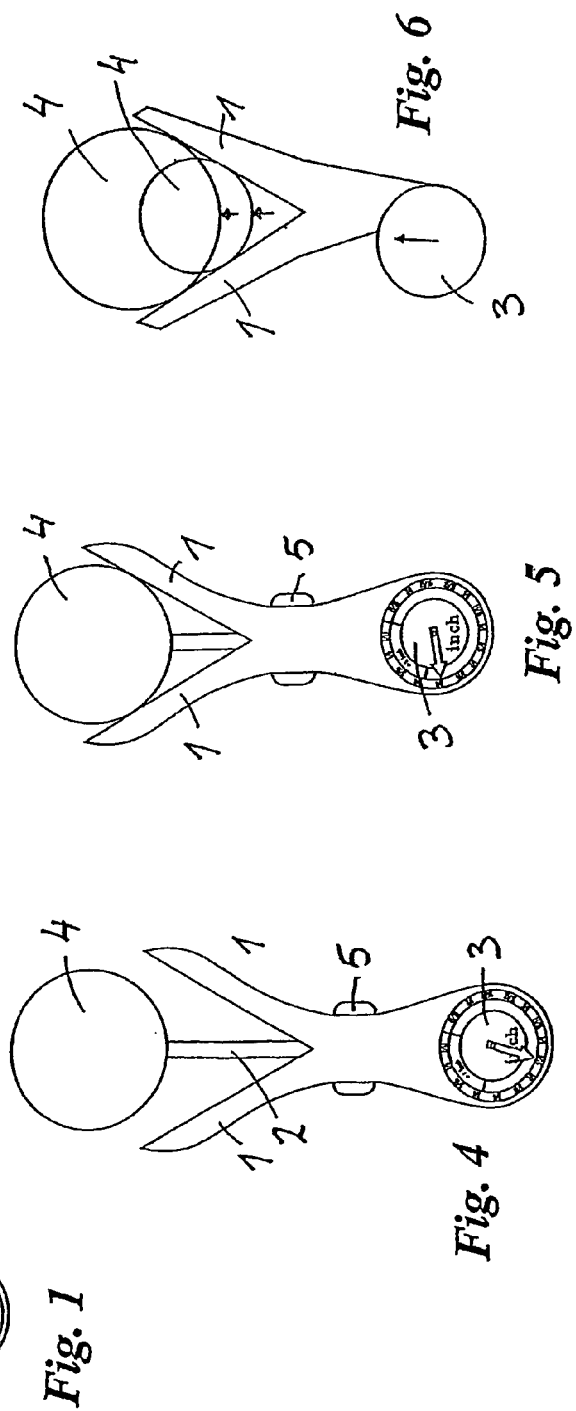

TOOL FOR MEASURING THE DIAMETER OF A BODY WITH POLYGONAL OR CIRCULAR CROSS SECTION

CROSS-REFERENCE TO RELATED APPLICATIONS

This application is a 371 of International Patent Application No. PCT/NO03/00060 filed Feb. 17, 2003 and published on Aug. 21, 2003 under publication number WO 03/069268 and which claims priority benefits from Norwegian Patent Application No. 2002 0795 filed Feb. 18, 2002.

BACKGROUND OF THE INVENTION

1. Field of the Invention

The present invention is related to a tool for measuring the diameter of a body with polygonal or circular cross section.

2. Description of Related Art

The most used tool for measuring the outside diameter of cylindrical bodies or the key width for hexagonal heads on screws or nuts, are slide calipers of various forms or compasses for feeling the diameter with subsequent measuring of the compasses' opening, mostly with a ruler. Also tapes for measuring the diameter's circumference are being used.

The calipers measure the distance between two diametrically opposite points, and therefore require the access to diametrically opposite sides of the cylindrical body, respectively the hexagonal head, which in many cases is difficult and in other cases impossible. Slide calipers require also in practice the use of two hands to separate the two parts of the calipers. The design of the calipers also requires suitable rooms for storage because of the size and the form.

The measuring tool for cylindrical bodies with circular cross sections are known from among others U.S. Pat. No. 1,389,486, U.S. Pat. No. 1,553,961 and GB 650 588.

The measuring tool according to the present invention avoids the above mentioned drawbacks, while other benefits are attained. The measuring tool is defined by the features set forth in the claims.

SUMMARY OF THE INVENTION

The present invention is a tool for measuring of the diameter of a body with circular cross section, where two arms (1) are provided in a fixed angle to another, in that a distance sensor device (2) is provided axially between the two arms (1), in that the distance sensor device (2) is adapted to register a contact point for the distance sensor device (2) against the body with respect to the contact points of the arms against the body, and that a viewing device (3) is adapted to calculate and show the diameter of the circle on the basis of the three contact points on the circle.

BRIEF DESCRIPTION OF THE DRAWINGS

FIGS. 1 and 2 on the drawing show an embodiment of the invention during two phases of measuring of the key width of a hexagonal nut, FIG. 3 shows a side view of a situation on FIG. 2, FIGS. 4 and 5 show, corresponding to FIG. 1 and two, measuring of the diameters of a cylindrical body with circular cross section, FIG. 6 shows schematically the instrument for measuring of two circular bodies with different diameters.

DETAILED DESCRIPTION OF THE EMBODIMENTS

Figure 8:
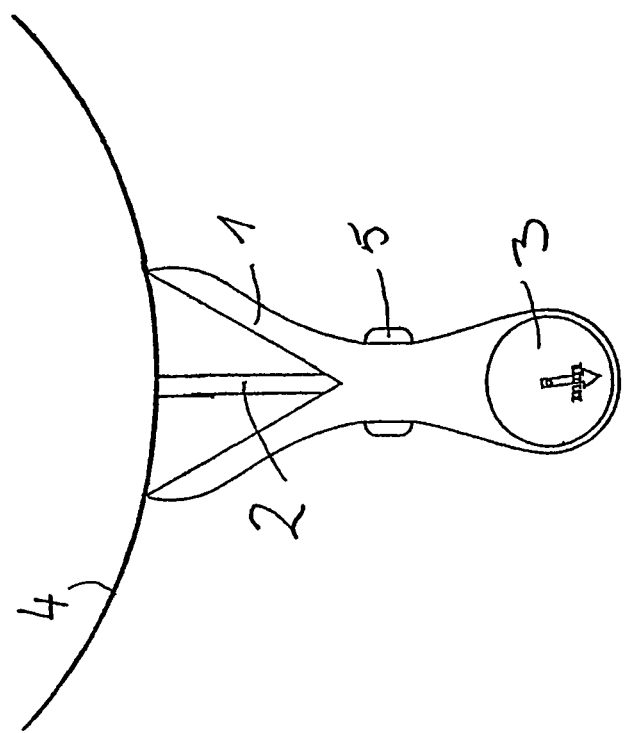
FIG. 8 shows the device on FIG. 7 measuring the outside diameter.

The measuring tool according to the present invention comprises two arms 1 arranged in an angle to each other. The angle between the arms 1 may preferably be 60.degree. for example, to make contact to two sides of a hexagonal head on a nut or bolt, as shown on FIGS. 1 and 2. The angle between the arms 1 for measuring of bodies with circular cross section may on the other hand be more or less than 60.degree. to fit special purposes that are for measuring of larger or smaller diameters.

Centrally between the two arms 1 is provided a distance sensor device 2 which is arranged to contact a circular arc in the central axis. When the two arms 1 each contact aside of a cylinder with circular cross section, the arms will make tangents to the cylinder's outside circumference. By registering these three points with respect to each other, the circle's diameter may be calculated, that is the distance between the two tangent points and the distance from the tangent points to the measuring point.

Suitably the measuring tool has a latching device 5 whereby the user can latch the distance sensor device 2 when this and the arms 1 have reached contact with the object 4 to be measured. Thereby the measurement may be kept and read separately, for example on a measuring disc or a viewing device 3, in millimeters or other units of measurement. The latching device 5 may also be arranged as an activating device, that is that the measurement takes place by activating the latching device 5 and that the latching device 5 registers the measuring result.

The measuring sensor device 2 may be a physical, preferably spring loaded needle or rod which makes direct contact against the measured object 4. Other measuring methods may be used, for example, the distance sensor device 2 may be a transmitter for infrared ray, ultrasound, laser beams etc. Also other mechanical measuring methods than the above mentioned may be used. Essential is that a circle's diameter may be calculated on the basis of the placement of the three contact points with respect to each other, based on the fact that these three points all are on the same circle. Measuring results may be shown on the viewing device 3 in the form of a pointer against the scale that shows the diameter in millimeter or other unit of measurement, or the viewing device 3 may be a digital display or other device on which the circle's diameter may be read. The reading may also be transferred and logged by a cable or a wireless connection as radio signals, for example to a hand held or stationary computer for similar device.

The measuring tool according to the invention may be embodied in small dimensions, and may be able to measure relatively large diameters, respectively large hexagonal nuts. This way the user may keep the tool on his body without hampering his movement. The arms 1 may be equipped with a telescopic adjustable extensions or replaceable arms 1 which may also have telescopic extensions.

Essential for measuring of correct diameter is that the length of the two arms 1 is sufficient to assure that the insides of the arms may contact the circle or measure object 4 as tangents to the circumference circle of the measured object 4. This is necessary to assure that the diametrical calculation of the diameter is correct.

The measuring tool may be embodied in different ways, depending on the user and the area of use. It is suitable that the measuring tool has a possibility calibration, not only at production, but also at a later point in time. The measuring tool may be made substantially smaller than sliding calipers and compass.

Figure 7:
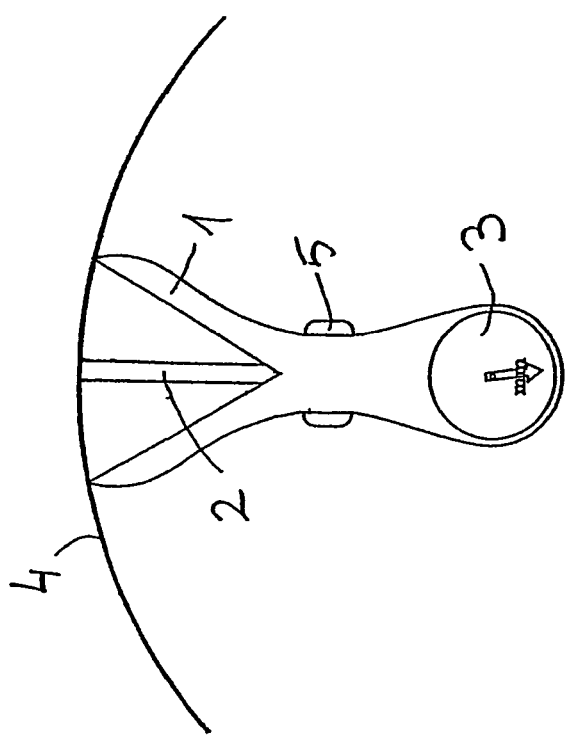
FIG. 7 shows another embodiment of the present invention measuring the inside diameter of the circle.

FIGS. 7 and 8 show another embodiment of the measuring tool according to the present invention. The points of the arms 1 are used to contact an in cross section circular body's inside or outside for measuring of inside or outside circle diameters. As for the earlier embodiment, the length of the arms 1 or the angle between them may be chosen suitably according to the use. Similarly, the distance sensor device 2 may be chosen according to the use. The measuring tool registers if the distance sensor device 2 senses a point outside or inside the point 1, respectively a line between these, that is measuring of inside or outside diameter.

Figure 9:
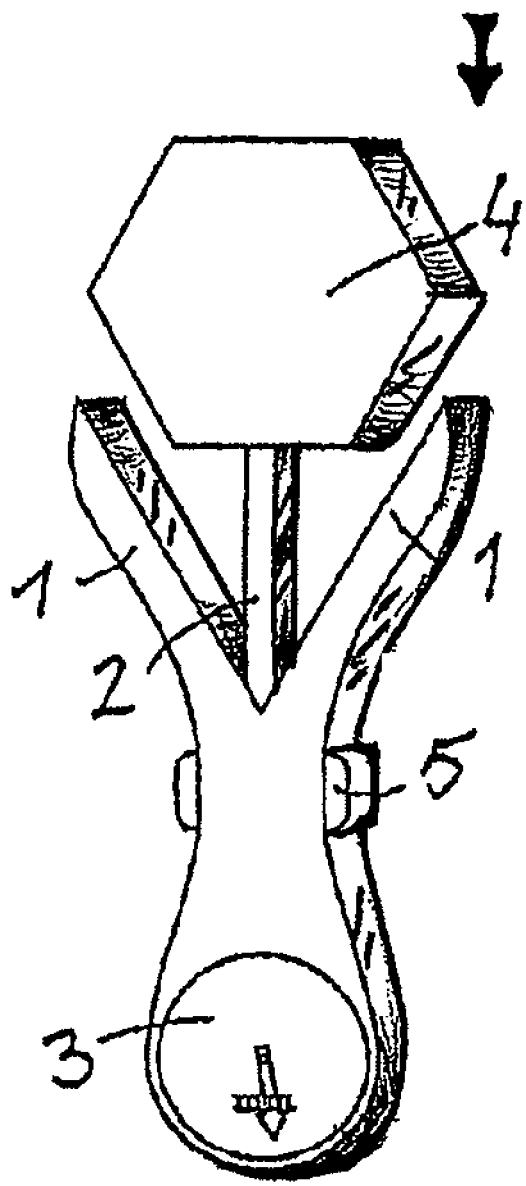
FIG. 9 is a profile view of the device, according to one embodiment of the invention.

FIG. 9 is a profile view of the measuring tool according to one embodiment of the invention. The tool has two arms (1), arranged at a fixed angle of 60° to each other, having flat contact surfaces on both arms to bear against two side contact faces of a hexagonal nut or bolt (4), a movable distance sensor device (2), also having a flat contact surface, arranged axially between the two arms (1) and adapted to contact a third contact face between the two side contact faces of the hexagonal nut or bolt (4), a latching device (5) whereby a user can latch the movable distance sensor device (2) when the three flat contact surfaces have reached the three contact faces of the hexagonal nut or bolt, and a viewing device (3) adapted to calculate and disclose the dimension of the hexagonal nut or bolt (4) based on the geometrical positions of the three contact points in relation to each other.

The viewing device 3 shows after calculations, the circle diameter whether the measurement is made as an inside measurement or an outside measurement, by basing the calculation on the distance from the connecting line between the points of the arms 1.

The invention claimed is:

1. Tool for determining the dimension of a hexagonal nut or bolt, comprising:
    two arms (1), arranged at a fixed angle of 60° to each other, having flat contact surfaces on both arms to bear against two side contact faces of the hexagonal nut or bolt;
    a movable distance sensor device (2), also having a flat contact surface, arranged axially between the two arms (1) and adapted to contact a third contact face between the two side contact faces of the hexagonal nut or bolt;
    a latching device (5) whereby a user can latch the movable distance sensor device (2) when the three flat contact surfaces have reached the three contact faces of the hexagonal nut or bolt; and
    a viewing device (3) adapted to calculate and disclose the dimension of the hexagonal nut or bolt based on the geometrical positions of the three contact points in relation to each other.

2. Tool according to claim 1, wherein the movable distance sensor device (2) is a preferably spring loaded mechanical sensor.

3. Tool according to claim 1, wherein the viewing device (3) is a digital display.

4. Tool according to claim 1, wherein the viewing device (3) is a pointer against a scale.

* * * * *